United States Patent [19]
Wetterhorn

[11] 3,776,041
[45] Dec. 4, 1973

[54] OIL FILLED PRESSURE GAUGE

[75] Inventor: Richard H. Wetterhorn, Fairfield, Conn.

[73] Assignee: Dresser Industries, Inc., Dallas, Tex.

[22] Filed: June 18, 1971

[21] Appl. No.: 154,539

[52] U.S. Cl. .................. 73/414, 73/418, 277/170, 285/DIG. 18
[51] Int. Cl. ............................................ G01l 7/04
[58] Field of Search ............... 73/431, 416, 418, 73/414, 392; 220/DIG. 18; 277/170; 285/DIG. 19

[56] References Cited
UNITED STATES PATENTS

| | | | |
|---|---|---|---|
| 3,701,284 | 10/1972 | De Meyer | 73/416 X |
| 2,272,811 | 2/1942 | Nathan | 277/170 |
| 3,066,961 | 12/1962 | Gerin | 277/170 X |
| 2,125,016 | 7/1938 | Gruver | 73/414 |
| 3,267,734 | 8/1966 | Marks | 73/414 |
| 3,141,335 | 7/1964 | Smith | 73/416 |
| 3,080,758 | 3/1963 | Decker | 73/292 X |
| 3,335,609 | 8/1967 | Nelson | 73/414 |
| 3,370,470 | 2/1968 | Neugebauer | 73/414 X |
| 2,175,993 | 10/1939 | Lighton | 220/DIG. 18 |
| 3,527,102 | 9/1970 | Harland | 73/416 X |
| 3,201,992 | 8/1965 | Hoff, Jr. | 73/416 |

FOREIGN PATENTS OR APPLICATIONS

| | | | |
|---|---|---|---|
| 464,733 | 5/1950 | Canada | 220/DIG. 18 |

Primary Examiner—Richard C. Queisser
Assistant Examiner—Daniel M. Yasich
Attorney—Robert W. Mayer et al.

[57] ABSTRACT

An oil receptive casing of a pressure gauge affording improvements for oil fill. Improvements include complete oil coverage over the dial face for undistorted readability and uninterrupted pointer dampening. A gasket seal construction at the casing and Bourdon tube socket joint maintains leak-tight reliability of the casing. An air cushion of controlled volume readily trapped behind the dial face, receives a removably secured safety plug enabling atmospheric venting in event of excessive internal overpressure.

14 Claims, 7 Drawing Figures

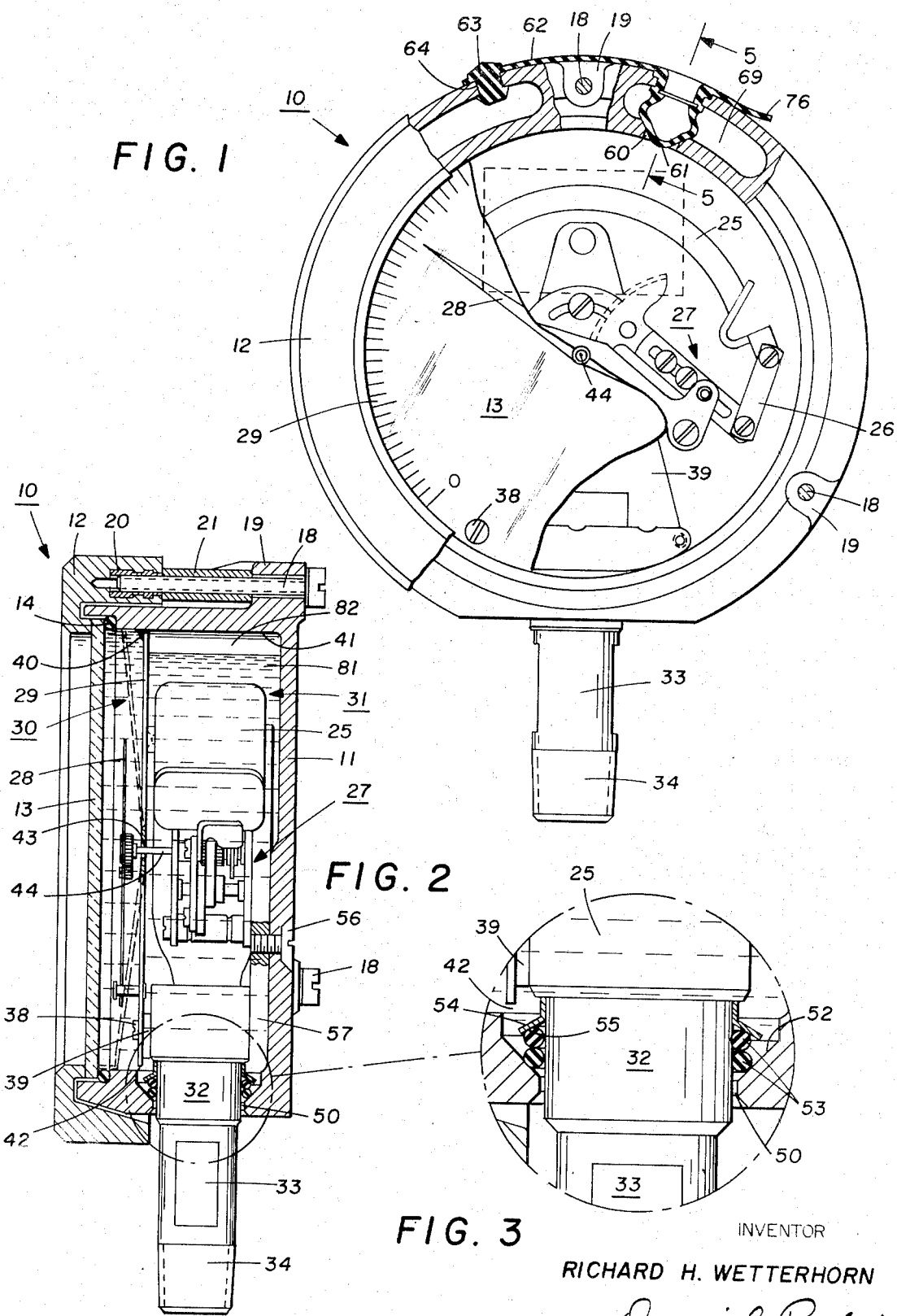
FIG. 1
FIG. 2
FIG. 3
INVENTOR
RICHARD H. WETTERHORN
ATTORNEY

INVENTOR
RICHARD H. WETTERHORN

ATTORNEY

OIL FILLED PRESSURE GAUGE

BACKGROUND OF THE INVENTION

1. The field of art to which the invention pertains includes measuring and testing as directed to fluid pressure guages having fluid pulsation dampening.

2. Pressure gauges and the like containing an oil fill have been widely used and are commercially available from a variety of manufacturing sources. Specific reasons for selecting or requiring an oil filled gauge versus a dry or oil unfilled gauge vary, but generally are attributed to either protecting the working mechanism against corrosion and/or system vibration or pulsation to which the instrument is subjected. While the prior art has provided gauge units for these purposes, they have been generally characterized as less than satisfactory in meeting basic construction requirements in a manner generally able to adequately cope with the many side effects which an oil fill imposes.

It should be appreciated at the onset that for obvious reasons an oil filled gauge casing should be leak-tight. This in itself has posed problems in the prior art which, in the usual manner, seal the casing to Bourdon tube socket by means of cementing or threading compound. Joints of this type have proven somewhat difficult and less reliable than expected. Also, the internal components when immersed in oil become isolated from barometric pressure changes rendering the instrument insensitive to an accurate "gage" readout. Moreover, the oil itself is subject to ambient pressure and temperature changes affecting its volume to in turn impose undesirable internal stresses adversely affecting accuracy of the instrument. Attempts to resolve these adverse side effects have given rise to use of an internal air cushion above the oil.

While the air cushion has somewhat minimized the aforementioned side effects, it has itself created additional problems from an inability to quality control the air volume from gauge to gauge whereby to maintain uniformity of readout accuracy. Moreover, the air cushion has heretofore imposed an oil line across the dial face distorting readability while at the same exposing an end portion of the gauge pointer outward of the oil. The latter is obviously unsatisfactory since it at least partially defeats the purpose for which the oil was intended. In addition, these prior gauges use a relief valve or the like to relieve pressure internally built up from system leakage or rupture. Although recognized as undesirable, these adverse effects have been tolerated for lack of a better solution.

SUMMARY

This invention relates to oil filled pressure gauges and specifically to improvements for oil filled gauges able to substantially if not completely eliminate the aforementioned side effects associated with such similar purpose gauges of the prior art. This is attained in accordance with the invention with an oil receptive gauge casing affording improved construction features. These features include a gasketed leak-tight joint seal between the casing and Bourdon tube socket. By means of an automatic oil limit fill, a reproducible air cushion of controlled volume is provided readily trapped behind the dial face as to avoid the oil line and afford distortion free readability. A simple, pneumatically sealed, collapsible safety plug extending from outward of the casing into the air cushion readily absorbs ambient induced internal overpressures above which the plug effects positive atmospheric venting for pressure relief. Consequently the gauge construction in accordance herewith overcomes long standing problems in fulfilling long felt needs in gauges of this type.

It is therefore an object of the invention to provide novel construction for a gauge receptive to oil fill.

It is a further object of the invention to provide an oil filled gauge having an air cushion, yet affording complete oil coverage over the dial face for undistorted readability and uninterrupted pointer dampening.

It is a further object of the invention to provide an oil filled gauge having a novel joint seal between the casing and stem socket of its contained Bourdon tube.

It is a further object of the invention to provide a novel oil filled pressure gauge providing for automatic oil limit fill achieving a controlled volume air cushion.

It is a further object of the invention to provide an oil filled gauge providing a novel atmospheric venting of internal casing overpressure.

It is a still further object of the invention to provide an oil filled gauge casing as in the aforementioned objects having a novel construction which is cost competitive with such similar purpose gauges of the prior art while eliminating many of the side effects previously associated therewith.

BRIEF DESCRIPTION OF THE DRAWINGS

FIG. 1 is a front elevation of an assembled gauge in accordance herewith partially broken away to facilitate an understanding of its construction;

FIG. 2 is a side elevation of the gauge of FIG. 1 shown sectioned through the casing portions thereof;

FIG. 3 is an enlarged fragmentary view of the encircled socket section of FIG. 2;

Reference is made to the drawings in which the construction features in accordance herewith will now be described. As illustrated in FIGS. 1 and 2, the gauge is comprised of a leak-tight housing generally designated 10. The housing is formed of a cup-shaped case 11 on the front of which is mounted a ring assembly 12 securing a transparent crystal 13 in leak-tight seal relation thereto by means of a compressed O-ring annular gasket 14. For effecting the latter seal there is provided a plurality of elongated screws 18 peripherally located at displaced angular intervals about the back face of case 11 to extend laterally through outermost casing flange 19. At their outboard end screws 18 threadably engage ring insert 20 such that when individually tightened, ring 12 is drawn inwardly of the casing against spacer sleeves 21.

Figure 4A:
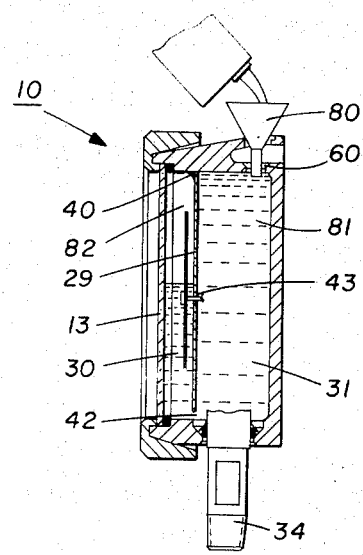
FIG. 4 (A), (B), and (C) illustrate sequential steps to manipulatively effect air cushion trapping at the casing rear.

Contained generally within the housing is a Bourdon tube 25 the free end of which is connected via a link 26 to movement 27 for operationally displacing pointer 28 relative to the front face of dial plate 29 in a conventional manner. The fixed end of Bourdon tube 25 is comprised of a socket 32 which integrally merges with a wrench engagable shank 33 terminating in threaded end 34 for connecting the gauge to a system with which it is to be used.

In order to obtain a leak-tight seal at the joint between casing 11 and Bourdon tube socket 32, the casing includes a pass aperture 50 at its underside complementarily shaped to receive the socket as best seen in FIG. 3. Immediately above aperture 50, the casing is chamfered or flared upwardly outward at 52 to form a recessed pocket in which to receive a single or double O-ring type gasket member 53 encircling socket 32. Opposite and facing chamfer 52 is a collar 54 loosely slip fit onto socket 32 and chamfered or flared downwardly outward in order to cooperate with chamfer 52 in confining gasket 53 within the pocket. Alternatively, the respective positions of chamfer 52 and collar 54 can be inverted to afford similar gasket confinement. For the latter arrangement collar 54 would be on the underside of aperture 50 facing upwardly with chamfer 52 facing downwardly for cooperation therewith.

Compression force for effecting the gasket seal is achieved by initially drawing shank 33 downward within the casing sufficient to permit their ultimate assembly. This relation is achieved when it becomes possible to secure them together by means of screws 56 engaging aligned taps in tube bracket 57. The screws are spaced at angular intervals about the casing back and preferably at least three such screws are employed which thereafter are effective to maintain the leak-tight joint about aperture 50. It should be apparent that the joint formation just described can be used not only in connection with a new gauge construction in the manner hereof but can likewise be employed for readily adapting existing gauges where desired to convert such gauges to liquid fill operation.

A unique feature in accordance with the invention is the distortion free readability of dial 29 which is mounted via screws 38 onto upstanding integral tube bracket 39, as is conventional, to locate the dial plate axially intermediate crystal 13 and tube 25. This dial location can be considered to define a separation between a front space or compartment 30 disposed extending toward the crystal and a rear space or compartment 31 containing tube 25 and disposed extending toward rear case 11. In addition to being mounted in the manner just described, a leak-tight sealant 40 is applied along the upper dial periphery. The sealant forms a uniformly extending leak-tight joint with internal axial casing surface 41 essentially separating front and rear compartments 30 and 31 respectively. The angular extent of sealant 40 is about 220 degrees equally distributed to provide an open passage 42 at the underperiphery of dial plate 29 interconnecting compartments 30 and 31. At the same time, dial plate 29 includes a central aperture 43 through which to receive a pin shaft 44 for operably connecting movement 27 to pointer 28 and which aperture includes an open clearance similarly interconnecting compartments 30 and 31.

Figure 4B:
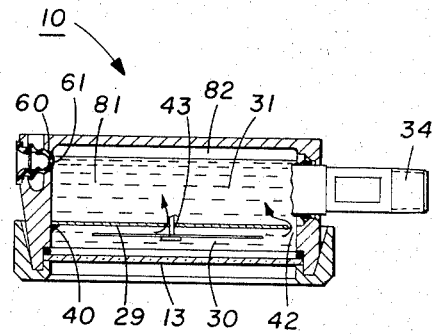
Figure 5:
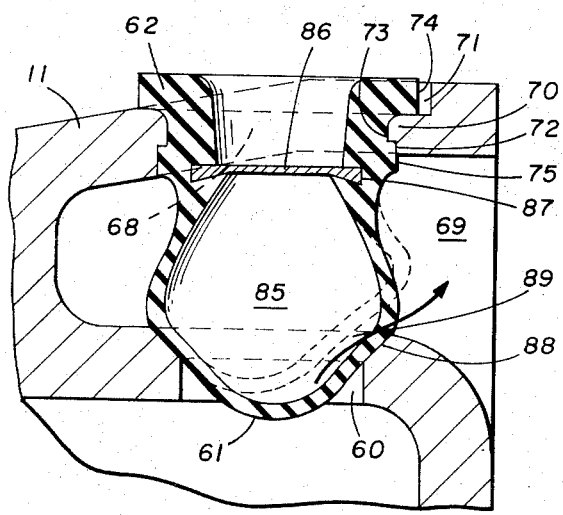
FIG. 5 is a fragmentary section as viewed substantially along the lines 5—5 of FIG. 1.
Figure 4C:
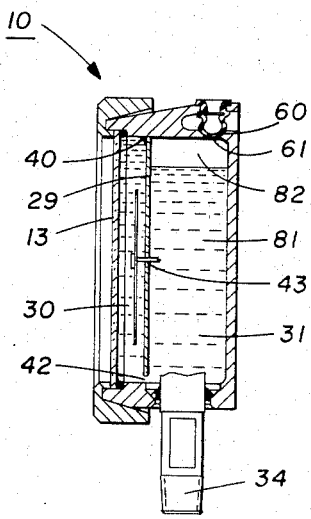

Oil used herein is generally characterized by high viscosity and good lubricity of grades commercially available in glycerin, silicone, mineral oil, etc. and is supplied to the casing in the manner most clearly shown in FIGS. 4 and 5. To receive oil, case 11 includes an inlet port 60 normally sealed by a removable bulbous safety plug 61 connected to a strap 62 which terminates in a hinge connection 63 received in case aperture 64 provided for that purpose. With plug 61 removed from port 60, a funnel or the like 80 is inserted as illustrated in FIG. 4(a) and through which oil 81 is poured. Adding of oil continues until its level reaches the crest of port 60 to fill space 31 and the lower half of space 30 via the interconnecting passages. Since at that point further quantities of oil cannot be added, an automatic fill limit is thereby imposed, resulting in a complete oil fill for compartment space 31. However, a trapped air cushion 82 results in the upper half of compartment space 30 atop the oil from about the upper edge defining aperture 43. With plug 61 replaced, the housing 10 is then tilted in the manner of FIG. 4(b) whereby to pass the gauge through the horizontal to the slightly inverted. This causes air cushion 82 to gradually pass or transfer through interconnecting passages 42 and 43 until collected in compartment 31 beneath the casing back wall. By restoring the gauge to its uprighted operable orientation in the manner of FIG. 4(c) air cushion 82 ends up trapped in back compartment 31 behind dial plate 29 confined in direct communication with the undersurface of plug 61. By this means, so long as the gauge is maintained in its vertically upright operable orientation air cushion 82 remains in the latter position as to afford a complete oil fill with the dial plate front free of an oil line and consequent readable distortion.

It should be appreciated that subsequently subjecting the gauge to other than vertical orientation, as during shipment or the like, can cause retransfer of air bubble 82 to front compartment 30. In that event, the transfer steps shown in FIGS. 4a and 4b need only be repeated. Alternatively, by forming dial plate 29 dish shaped peripherally sealed throughout and diverging outwardly to aperture 43, as shown phantom dashed in FIG. 2, the air bubble once transferred into compartment 31 through aperture 43 cannot return to compartment 30.

Relief venting and accommodation of ambient induced pressure changes is provided by sealed bulbous plug 61 of pliable composition having wall thickness and hardness on the order of 0.050 inches and 40–50 durometer respectively. To effect these purposes plug 61 is secured in a casing port 68 located coaxial but spaced from port 60 by a rearward facing intervening air space 69. Port 68 includes radial inward annular flange 70 between counterbores 71 and 72 which cooperate with plug recess 73 and flanges 74 and 75 respectively for effecting a secure interlock therebetween. A strap extension 76 affords a ready finger grip for snap-out removal of the plug when desired.

Bulbous sealing of the plug is by means of a transverse metal disc 86 secured air tight within annular internal plug recess 87 as to trap an original atmospheric air volume 85 therein. With the plug secured in port 68 in the manner described, its underend deforms as shown solid in FIG. 5. This produces a force fit superimposed in conforming overlying relation with port 60 annular chamfer 88 in effecting an air tight seal thereat. The deformation thus incurred compresses air volume 85 increasing its pressure to a level sufficient to resist or offset an opposite like-increase in ambient induced internal pressure imposed against air cushion 82. Should, however, the latter pressure increase to a value exceeding that of the plug bulb, as might for example be caused by a Bourdon tube rupture or the like, the bulb incurs further deformation (as shown phantom dashed in FIG. 5) at least partially lifting it from surface 88. When so lifted there is effected a vent passage 89 sufficient to relieve such overpressure into atmospheric space 69. On excess pressure being relieved and venting completed, bulb 61 immediately restores its previous contour conforming fit with chamfer 88 whereby a seal against air leakage will thereafter continue. In a preferred embodiment plug 61 acts to restrain increases in internal pressure up to about 8–10 psi after which relief atmospheric venting occurs. With this construction, explosive conditions which could otherwise distress, shatter, or blowout crystal 13 are substantially prevented while ambient changes, as might occur from air shipment or like, are readily accommodated. Oil leakage is substantially prevented in any event.

By the above description there is disclosed a novel oil filled gauge construction affording virtues of construction not previously available with such similar purpose gauges of the prior art. By means of an accurate oil fill limit the remaining air cushion volume from gauge to gauge is readily and accurately available establishing a quality control in manufacture enhancing operable accuracy of the instrument. With the manner of dial plate connection to internally of the casing, it is conveniently possible to eliminate the oil line otherwise visible through the crystal as to provide distortion free readability thereof while obtaining the intended pulsation control over the entire length of dial pointer 28. Moreover, safety plug 61 in accordance herewith effects a novel result not previously available with such gauge constructions in affording a combination bladder and vent relief to accommodate limited internal pressure changes while effecting positive venting to atmosphere in the event such pressures reach excessive levels. Consequently, the construction in accordance herewith fulfills long felt needs in providing highly desirable improvements to gauges of this type.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pressure gauge comprising in combination:
   a. a pressure sensitive element operably responsive to changes in pressure to which it is exposed;
   b. a sealed housing containing said pressure sensitive element and comprising components supported in leak-tight relation to each other including:
      1. a cup-shaped casing having a back wall and a laterally extending shell wall enclosure peripherally connected thereto; and
      2. a crystal secured to internally of said casing;
   c. plate means secured to internally of said casing at a location laterally intermediate said crystal and said back casing wall to substantially define a front compartment space disposed thereat extending toward said crystal and a rear compartment space disposed thereat extending toward said casing backwall;
   d. inlet port means extending through an outer wall of said casing defining an external to internal access to one of said compartments through which to receive oil internally of said housing for fill to a predetermined level at which to insure a controlled size air cushion openly exposed in contact with the oil fill within the housing; and
   e. trap means defined by said plate means and operatively effective to enable trapped position transfer of the air cushion from the space in said front compartment to substantially totally within said rear compartment space for the intended operable orientation of said housing.

2. A pressure gauge according to claim 1 in which said plate means includes a defined oil passage interconnecting said front and rear space compartments at predetermined radial locations thereon comprising said trap means, said oil passage being effective in response to a tilting orientation of said housing to enable air to be transferred from said front to said rear space compartment.

3. A pressure gauge according to claim 2 in which said plate means comprises the dial plate for said gauge.

4. A pressure gauge according to claim 2 in which said plate means is dish shaped peripherally diverging toward said crystal.

5. A pressure gauge according to claim 1 in which said pressure sensitive element comprises a Bourdon tube secured in said rear space compartment and said housing includes a leak-tight joint between said casing and the socket of said Bourdon tube, said joint being comprised of:
   a. resilient gasket means supported intervening between said socket and said casing thereat; and
   b. compression means acting to maintain said gasket means under compression for effecting said joint.

6. A pressure gauge according to claim 5 in which said compression means comprises:
   a. a collar on said socket angled outwardly therefrom in a direction facing the casing wall thereat;
   b. a chamfer on the casing wall thereat cooperating with said collar to define an encircling pocket therebetween containing said gasket; and
   c. means to secure said collar and said chamfer in a relatively compression fit for maintaining said gasket in compressed sealing relation thereat.

7. A pressure gauge according to claim 6 in which said collar is supported on said socket internally of said housing.

8. A pressure gauge according to claim 1 including a safety plug secured extending inward of said casing in operable communication with said air cushion, said safety plug being effective to vent said air cushion to atmosphere in the event of internal housing pressure in excess of a predetermined minimum.

9. A pressure gauge according to claim 8 in which said safety plug operably cooperates with the inlet port means of said casing.

10. A pressure gauge according to claim 8 in which said safety plug comprises a pliable air sealed bulbous member deformable in response to excess pressure for exposing said inlet port means to atmosphere.

11. A pressure gauge comprising in combination:
    a. a pressure sensitive element operably responsive to changes in pressure to which it is exposed;
    b. a sealed housing containing said pressure sensitive element and comprising components supported in leak-tight relation to each other;
    c. inlet port means in said housing in which to receive oil internally thereof for fill to a predetermined level at which to insure a controlled size air cushion openly exposed in contact with the oil fill within the housing; and
    d. a deformable safety plug comprised of an air sealed bulbous member secured within an opening defined in an outer wall of said housing and extending inwardly thereof in communication with said air cushion, said safety plug being operably effective to seal said opening at internal housing pressure less than a predetermined minimum and to deform from the sealing of said opening for venting said air cushion to atmosphere in the event of internal housing pressure in excess of said predetermined minimum.

12. A pressure gauge according to claim 11 in which said opening comprises said inlet port means and said safety plug cooperates with the inlet port means for operable effectiveness thereof.

13. A pressure gauge comprising in combination:
 a. a housing comprising components supported in leak-tight relation to each other;
 b. inlet port means in said housing in which to receive oil internally thereof for fill to a predetermined level at which to insure a controlled size air cushion openly exposed in contact with the oil fill within the housing;
 c. a Bourdon tube within said housing supported with its inlet socket extending outward of said housing through an opening defined in a wall thereof; and
 d. means forming a leak-tight joint between said housing and the socket of said Bourdon tube, said joint including resilient gasket means supported intervening between said socket and the housing thereat; and compression means acting to maintain said gasket means under compression for effecting said joint wherein said compression means comprises:
  1. a collar positionedly maintained on said socket and angled outwardly therefrom in a direction facing the housing wall thereat;
  2. a chamfer on the housing wall thereat cooperating with said collar to define an encircling pocket therebetween containing said gasket means; and
  3. means to secure said collar and said chamfer in a relatively compression fit for maintaining said gasket means in compressed sealing relation thereat.

14. A pressure gauge according to claim 13 in which said collar is supported on said socket internally of said housing.

* * * * *